United States Patent [19]

Barrett

[11] Patent Number: 5,572,857
[45] Date of Patent: Nov. 12, 1996

[54] SHEAR WITH ADJUSTABLE BLADE SPACING

[76] Inventor: Robert D. Barrett, 10261 Canterbury St., Westchester, Ill. 60154-3640

[21] Appl. No.: 417,942

[22] Filed: Apr. 6, 1995

[51] Int. Cl.⁶ .................................................. A01D 1/08
[52] U.S. Cl. ............................... 56/298; 56/242; 56/304
[58] Field of Search .......................... 56/298, 13.6, 16.9, 56/13.7, 299, 307, 236, 242, 259, 304, 306

[56] References Cited

U.S. PATENT DOCUMENTS

| | | | |
|---|---|---|---|
| 383,057 | 5/1888 | Kendrick | 56/304 X |
| 3,099,125 | 7/1963 | Turner | 56/298 X |
| 3,121,303 | 2/1964 | Tomlinson et al. | 56/297 X |
| 3,199,279 | 8/1965 | Yeske | 56/308 X |
| 3,203,162 | 8/1965 | Blaauw et al. | 56/297 |
| 3,722,196 | 3/1973 | Templeton | 56/298 |
| 3,802,171 | 4/1974 | Cousino | 56/259 X |
| 4,553,380 | 11/1985 | O'Halloran | 56/298 X |
| 4,593,800 | 6/1986 | Ness et al. | 192/56 R |
| 5,048,276 | 9/1991 | Miller | 56/13.7 X |

*Primary Examiner*—Terry Lee Melius
*Assistant Examiner*—Heather Chun Shackelford
*Attorney, Agent, or Firm*—Rick Martin

[57] ABSTRACT

A shear capable of cutting weeds close to the ground, without cutting grass in the presence of the weeds, is described. The shear can be implemented as a battery operated hand held device or as a shear mounted on a lawn mower. The shear operates by maintaining a spacing between the blades such that the flexible grass will only be bent between the blades. Weeds which have a thicker and stiffer shaft than the grass will be cut, thus functioning as a selective mechanical herbicide.

14 Claims, 6 Drawing Sheets

SHEAR WITH ADJUSTABLE BLADE SPACING

FIELD OF INVENTION

The present invention relates to lawn mowers and shears with adjustable blade spacing. With a close blade spacing, the shear will cut weeds and grass. With a wide blade spacing the shear will cut only the weeds and leave the grass unharmed, functioning as a mechanical herbicide.

BACKGROUND OF THE INVENTION

Lawn weeds are usually killed by chemical treatments. However, chemicals harm the environment; and chemicals cost money. Shears have generally not been used to kill weeds.

The use of shears for cutting grass is well known. Shears are used to cut grass to provide an attractive lawn. However, when weeds are cut it is desirable that they be cut close to the ground in order to kill them. With normal shears the grass in the presence of the weeds will be cut too short, and the grass will die.

A device is needed which will cut the weeds close to the ground without cutting or harming the grass.

The present invention describes a shear mounted on a lawn mower for cutting weeds close to the ground before the lawn mower cuts the grass at a normal height. Shears have been mounted on lawn mowers before, but were designed to cut tall grass so the lawn mower could cut the grass at a normal height in one pass of the mower. With the present invention, the shear blades are adjusted to a wide separation which cut the stiff shanks of a weed, but do not cut the grass. The grass simply folds over between the blades.

SUMMARY OF THE INVENTION

The primary object of the present invention is to provide a device to cut weeds close to the ground without cutting the grass near the weeds.

Other objects of this invention will appear from the following description and appended claims, reference being had to the accompanying drawings forming a part of this specification wherein like reference characters designate corresponding parts in the several views.

The preferred embodiment of the invention teaches a fixed shear blade and a moving shear blade separated by an adjustable clearance from zero to thirty thousandth of an inch. The object of the clearance is to enable the cutting of weeds without cutting the grass in the presence of the weeds.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
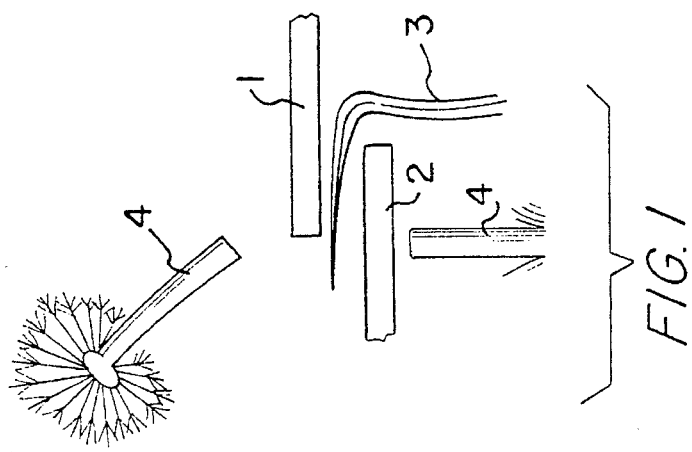
FIG. 1 is a side perspective view of shear blades in operation with a space between the shear blades allowing grass to remain uncut while cutting weeds.

The present invention shown in FIG. 1 is a shear in which the blade spacing is controllable. The shear blades 1 and 2 will cut weeds 4 close to the ground and leave the grass 3 uncut. The spacing between the blades is controllable from touching to a separation of 0.030"±0.005". The shear can operate by holding one of the blades stationary and moving the other blade or by moving both blades with respect to each other. All embodiments shown could utilize these blade characteristics.

Figure 3:
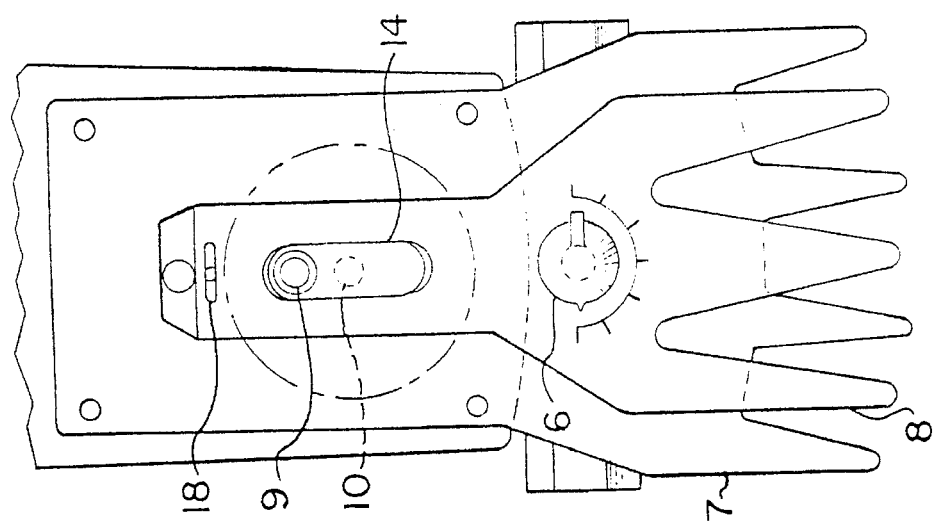
FIG. 3 is a top plan view of the shear mechanism of FIG. 2 with the protective cover removed.
Figure 2:
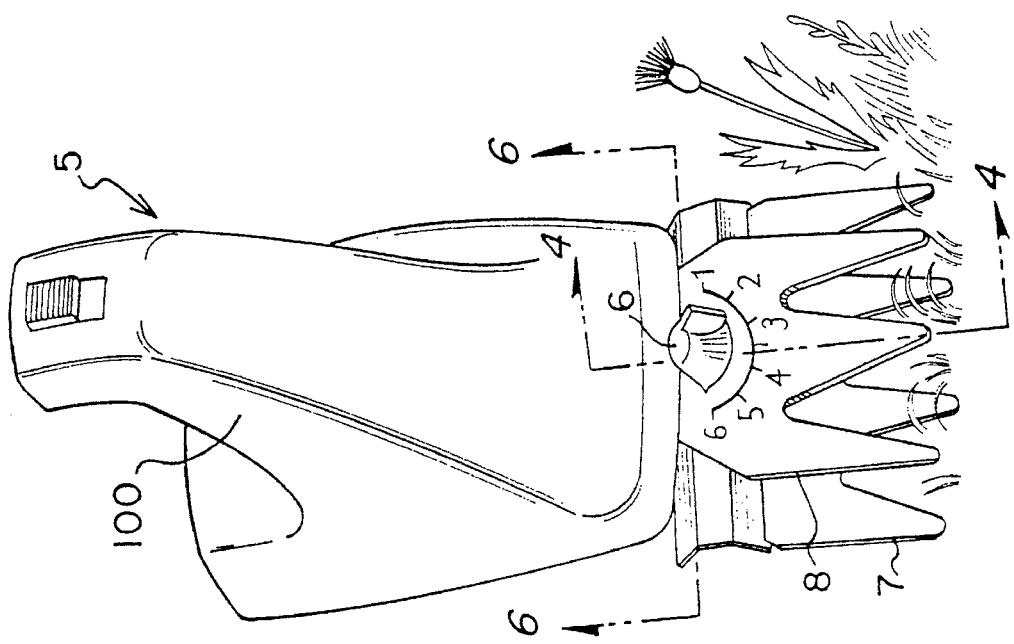
FIG. 2 is a front perspective view of a battery operated shear incorporating the preferred embodiment of the invention.

FIG. 2 is a battery operated trimmer 5 which uses the current invention. The invention could also be implemented as a hand operated trimmer (not shown).

Figure 4:
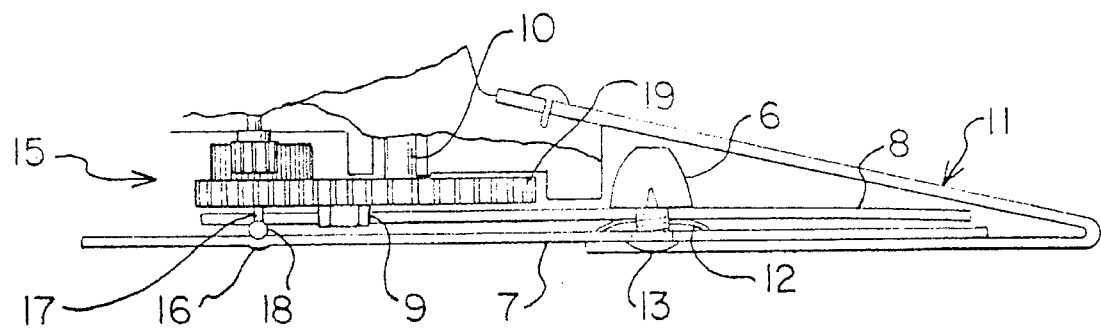
FIG. 4 is a sectional view taken along line 4—4 of FIG. 2. A finger guard also functioning as a comb and lifter has been added to the embodiment shown in FIG. 2.

FIGS. 3, 4, 5, and 6 show various views of the internal works of the battery operated trimmer 5. Additionally, FIG. 4 shows a finger guard and lifter comb 11 which is not shown in the other figures for clarity. The finger guard 11 is used for safety and to align the weeds for cutting by the shear blades 7 and 8. The spacing between the fixed shear blade 7 and the moving shear blade 8 is controlled by the adjustable knob 6.

The spacing is further controlled by a ball bearing 18. The ball bearing 18 rides in bearing seats 16 and 17 in the two blades 7 and 8 respectively. The gear train 15 is driven by the battery operated electric motor (not shown). The output drive gear 19 has a bearing 9 mounted offset from the output drive gear shaft 10. The bearing 9 drives the moving shear blade 8 through the slot 14. The protective cover 100 can be removed to show the mechanism in FIG. 3.

Figure 5:
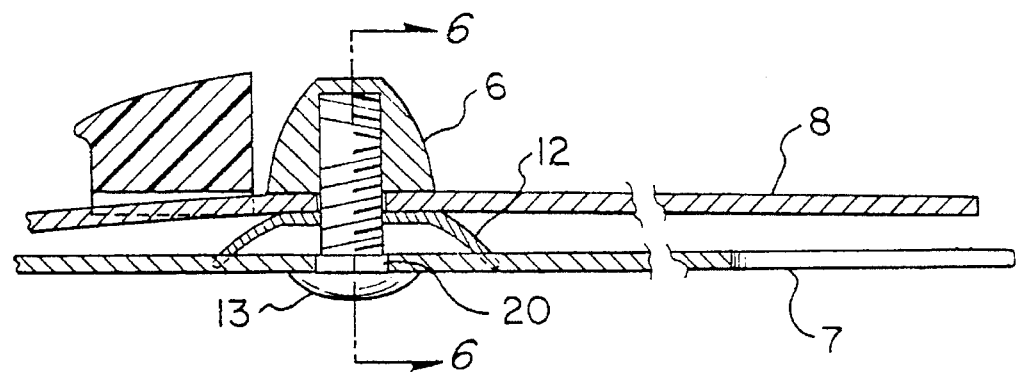
FIG. 5 is a close-up of FIG. 4 showing the adjustment mechanism.
Figure 6:
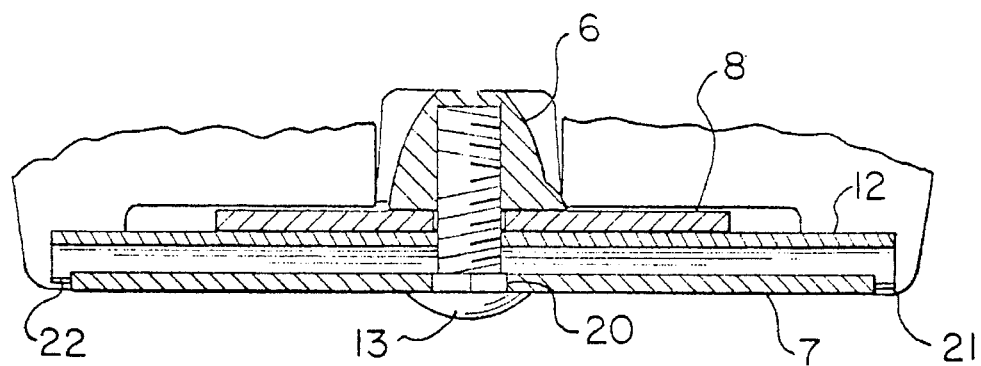
FIG. 6 is a sectional view taken along line 6—6 of FIG. 2 of the preferred embodiment that shows the spring capturing the fixed shear plate.

FIGS. 5, 6 show the mechanism for maintaining the desired spacing between the fixed shear blade 7 and the moving shear blade 8. The bolt 13 is constrained from turning by the bolt hole 20 in the fixed shear blade 7. The bolt 13 is not round at the location that is in the bolt hole 20. The spacing spring 12 is mounted on bolt 13 between shear blades 7 and 8.

The spacing spring 12 is prevented from turning by lips 21 and 22 which fit around the fixed shear blade 7. The tension on the spacing spring 12, and thus the spacing between the shear blades 7 and 8, is controlled by the adjustable knob 6.

The adjustable knob 6 is constrained from moving, when the shear is running, by a locking mechanism (not shown). The locking mechanism can be a nylon insert in the bolt 13 or a distorted thread in the bolt 13 or adjustable knob 6. The adjustable knob 6 has six settings:

1. Thick weeds only;
2. Medium thick weeds;
3. Thin weeds;
4. Thin weeds and grasses with thick leaves;
5. All weeds and grasses with medium thick leaves; and
6. All weeds and grasses.

Figure 7:
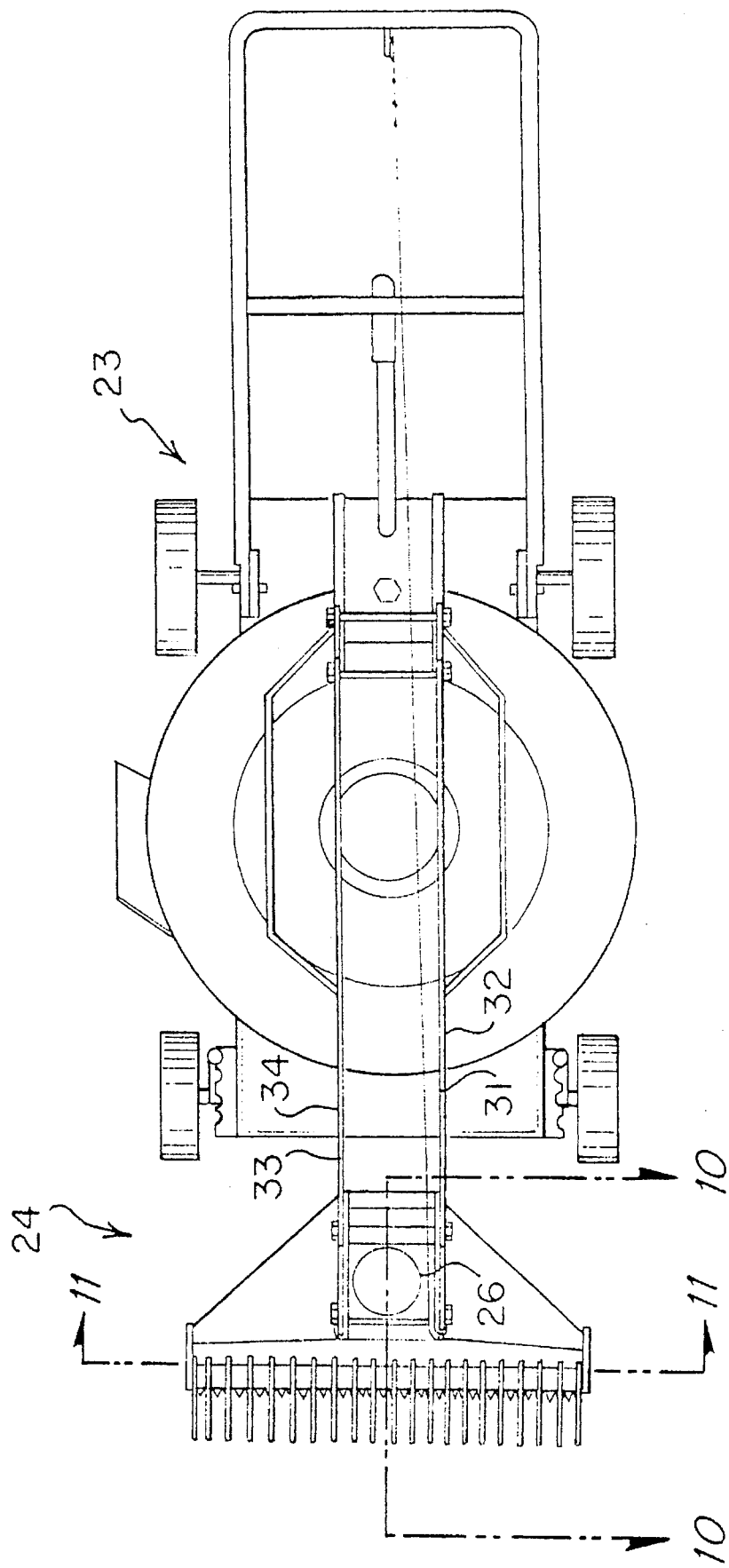
FIG. 7 is a top plan view of an alternate embodiment of the invention on a lawnmower.
Figure 8:
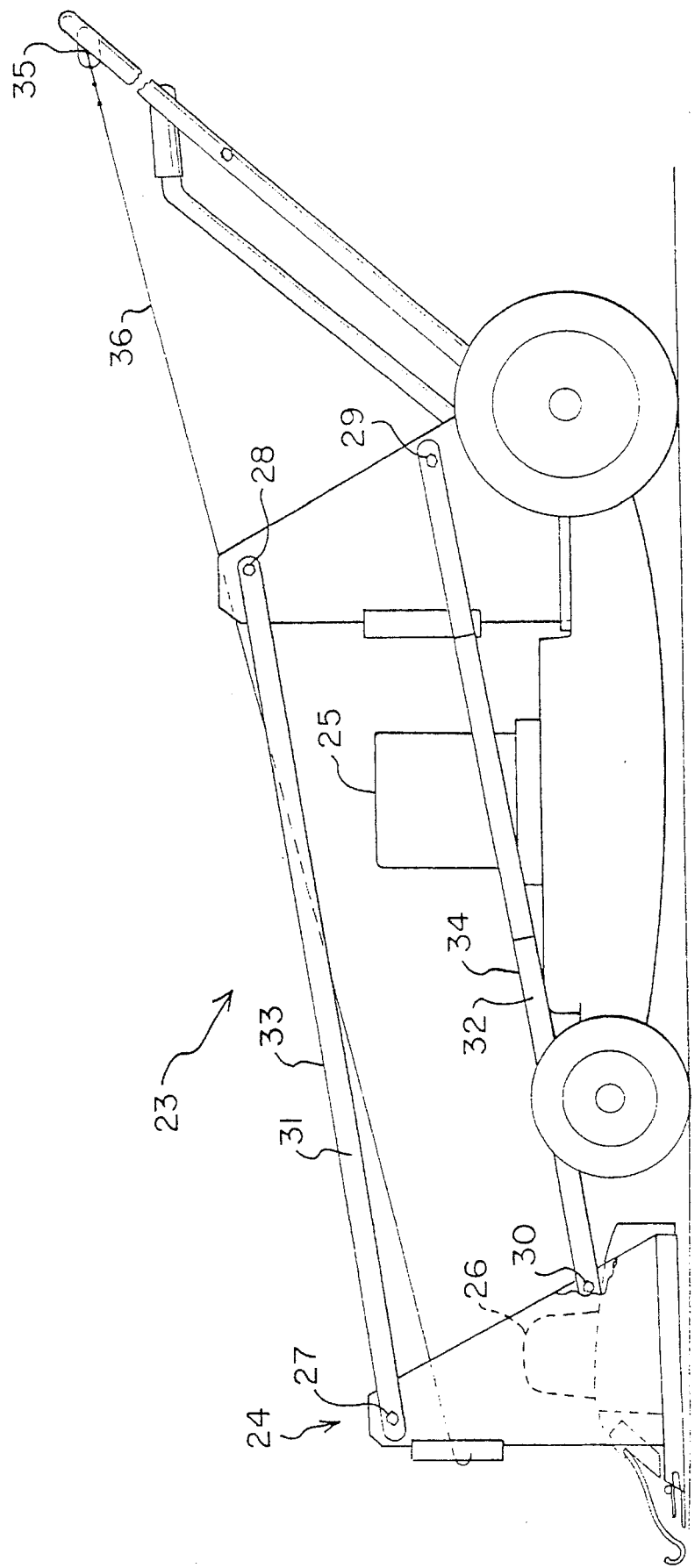
FIG. 8 is a side plan view of the lawnmower of FIG. 7 with an embodiment of the invention having an electric motor driving the shear.

FIGS. 7, 8 are two views of a second preferred embodiment of the invention. Referring to FIGS. 7 and 8, an electric lawn mower 23 has attached a removable shear mower 24. The shear mower 24 cuts weeds only close to the ground ahead of an electric lawn mower 23. The electric motor 25 drives the mower 23. The shear mower 24 has its own electric motor 26. The shear mower 24 is attached to the lawn mower 23 by four attachment arms 31, 32, 33, and 34. The shear mower 24 and attachment arms 31 to 34 can be removed from the lawnmower 23 by removable bolts 27, 28, 29, and 30. The height of the shear mower is controlled by adjustment cable 36 through adjustment 35.

Figure 9:
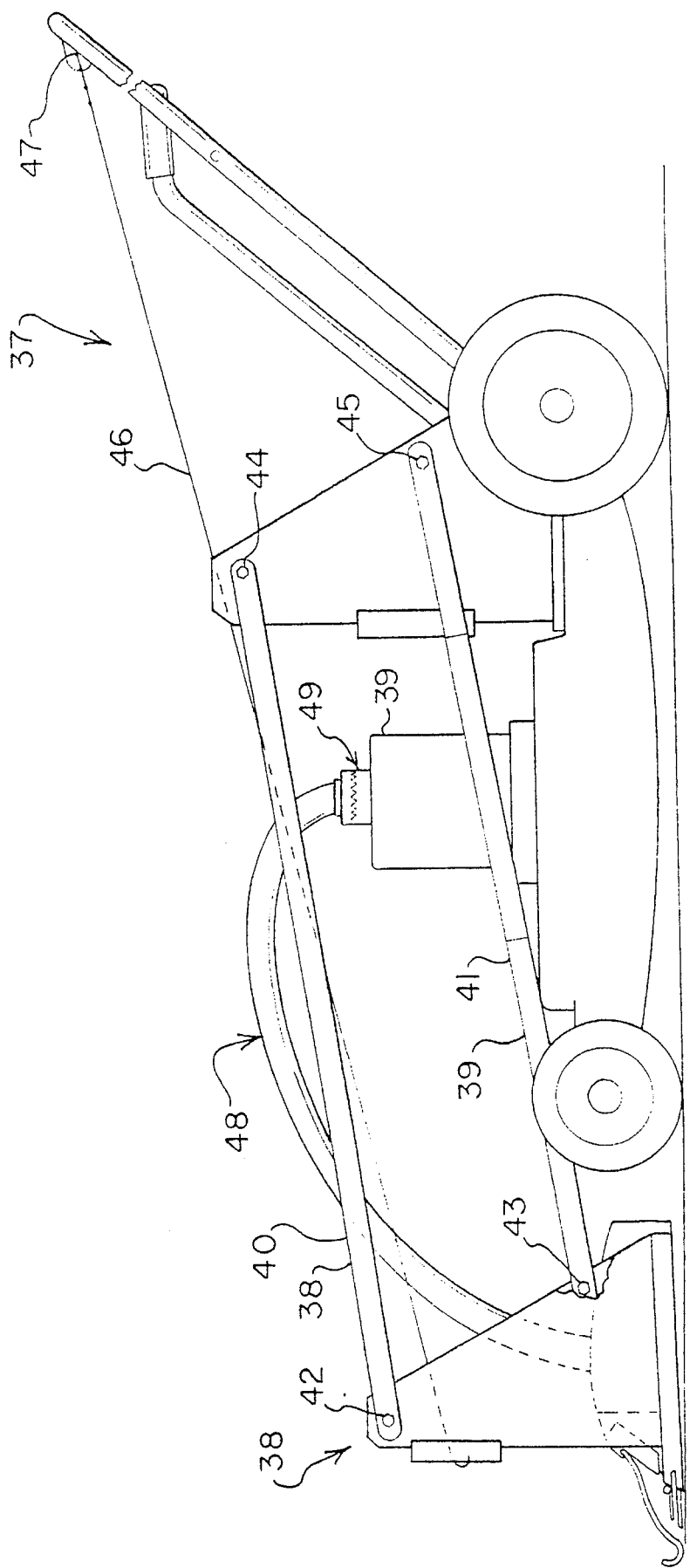
FIG. 9 is a side plan view of the lawnmower of FIG. 7 with the shear driven by a flexible cable attached to the lawnmower motor via a clutch coupling.

Referring to FIG. 9 an alternative embodiment is shown. An electric lawn mower 37 has attached a removable shear mower 38. The electric motor 39 drives the mower 37 and shear mower 38 through flexible cable drive 48 and clutch coupling 49. The clutch coupling 49 is removable for fast assembly and disassembly. In this embodiment of the invention the electric motor 39 will have to have sufficient power to drive the lawn mower 37 and the shear mower 38.

The shear mower 38 is attached to the lawn mower 37 by four attachment arms 38, 39, 40, and 41. The shear mower 38 and attachment arms 38 to 41 can be removed from the lawnmower 37 by removable bolts 42, 43, 44, and 45. The height of the shear mower is controlled by adjustment cable 46 through adjustment 47.

Figure 10:
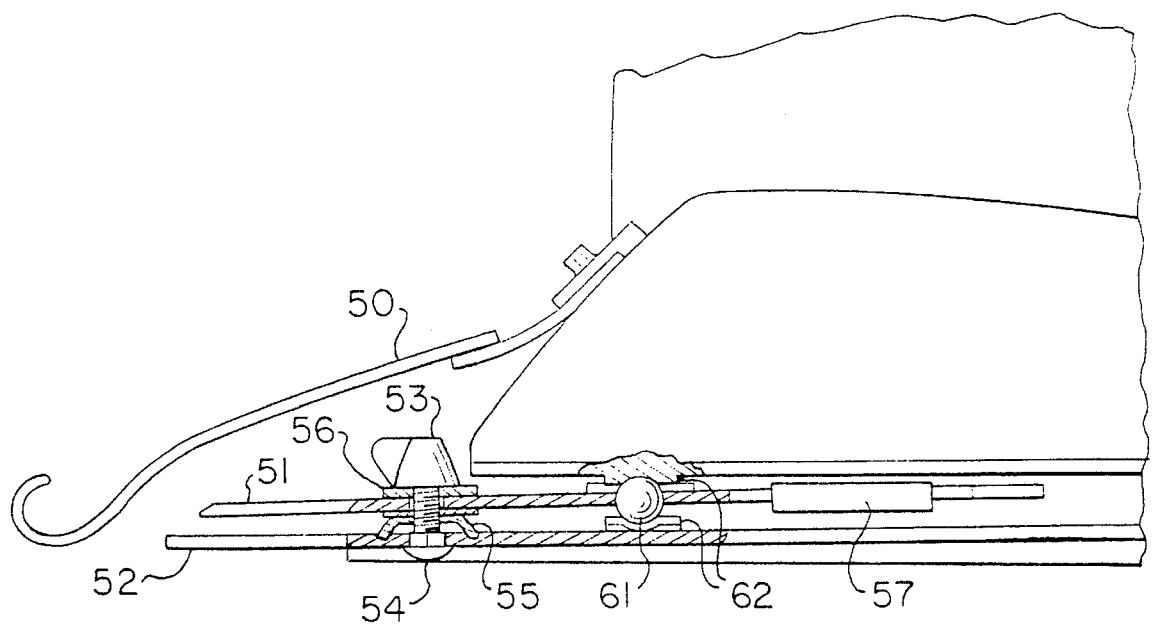
FIG. 10 is a side sectional view taken along line 10—10 of the shear of FIG. 7 showing the spacing mechanism and the finger and toe guard.
Figure 11:
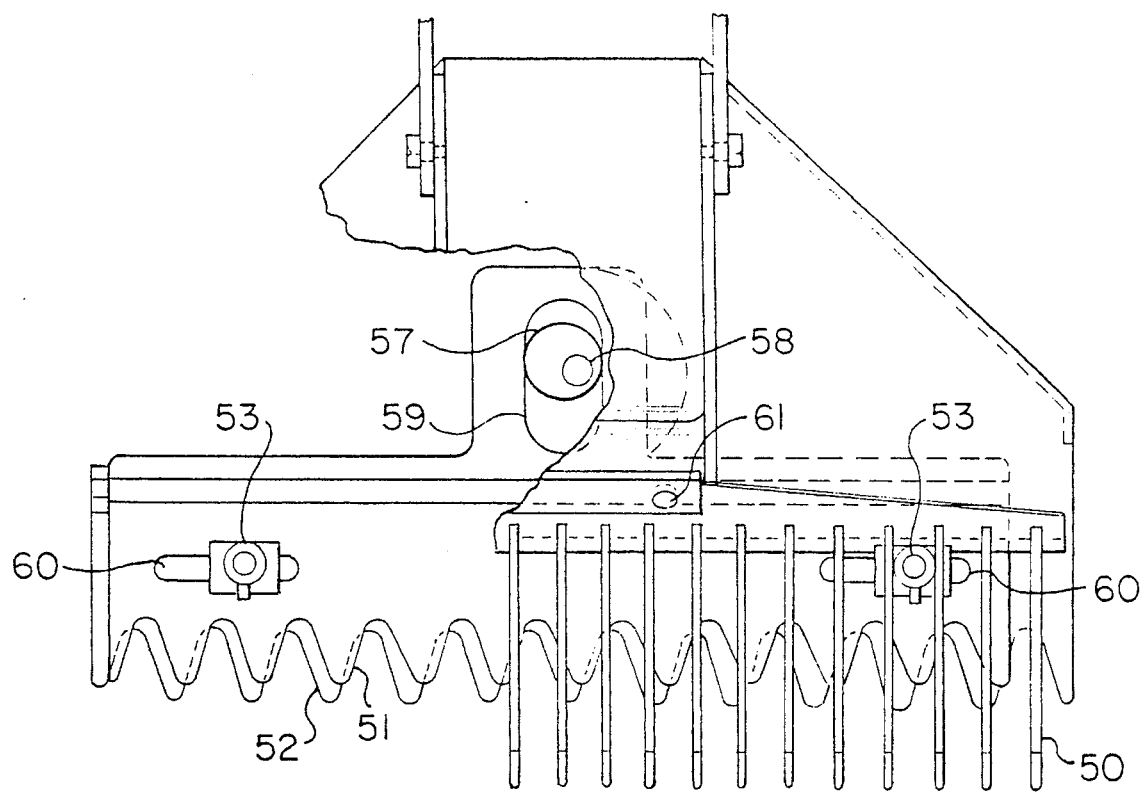
FIG. 11 is a top plan view with a sectional view of the shear of FIG. 7 showing the spacing mechanism and the finger and toe guard.

FIGS. 10, 11 are the mechanism of the shear mowers 24 or 38 shown in FIGS. 7, 8, and 9. The shear mowers 24 or 38 have a finger guard 50 for the protection of fingers and toes and to protect the shear blades 51 and 52 from foreign debris. The finger guard 50 also aligns the grass and weeds for cutting. The spacing between the fixed and movable blades 51, 52 is continuously adjustable between zero clearance for cutting all weeds and grasses to a clearance of 0.030±0.005 inches for cutting only weeds. The spacing is continuously variable to accommodate a variety of weeds and grasses. The spacing between the shear blades 51, 52 is controlled by adjustment knobs 53 and by spring 55. The adjustment knobs 53 are on bolts 54. On the bolts 54 are spacers 56 which allow the movable shear blade 51 to move past the fixed bolts 54 through slots 60.

The movable shear blade 51 is driven by cam 57 turning on shaft 58 in slot 59. The movable shear blade 51 is constrained to move in the proper direction for shear operation by ball bearings 61 traveling in race 62.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A shear functioning to cut weeds and to bend grass comprising:

a first shear blade;

a second shear blade oscillating proximate to the first shear blade;

a spring means between said first shear blade and said second shear blade functioning to maintain a separation between said first and second shear blades; and an adjustment means functioning to modulate a tension in the spring means, thereby controlling the separation between said first and second shear blades so as to cut weeds which are relatively thicker than the surrounding grass and permit the grass to bend between the first and second shear blades.

2. The shear of claim 1, wherein said spring means further comprises a spacing spring.

3. The shear of claim 1, wherein said first shear blade is fixed.

4. The shear of claim 1, wherein the adjustment means further comprises a bolt and an adjustment knob clamping the first and second shear blades together.

5. The shear of claim 4, wherein the adjustment knob further comprises a setting functioning to narrow the separation to cut both weeds and grass.

6. The shear of claim 1, further comprising a power means functioning to oscillate said second shear blade.

7. The shear of claim 6, wherein said power means further comprises an electric motor.

8. A lawn grooming system comprising:

a power lawn mower;

a weed cutting assembly mounted on said power lawn mower;

said weed cutting assembly further comprising a power means to oscillate a second shear blade;

a first shear blade;

said second shear blade oscillating proximate to the first shear blade;

a spring means between said first shear blade and said second shear blade functioning to maintain a separation between said first and second shear blades; and an adjustment means functioning to modulate a tension in the spring means thereby controlling the separation between said first and second shear blades so as to cut weeds which are relatively thicker than the surrounding grass and permit the grass to bend between the first and second shear blades.

9. The system of claim 8, wherein said power means further comprises an electric motor.

10. The system of claim 8, wherein said power means further comprises a shaft means from the power lawn mower.

11. The shear of claim 8, wherein said spring means further comprises a spacing spring.

12. The shear of claim 8, wherein said first shear blade is fixed.

13. The shear of claim 8 wherein the adjustment means further comprises a bolt and an adjustment knob clamping the first and second shear blades together.

14. The shear of claim 13, wherein the adjustment knob further comprises a setting functioning to narrow the separation to cut both weeds and grass.

\* \* \* \* \*